(12) United States Patent
Aras (10) Patent No.: US 7,036,139 B2
(45) Date of Patent: Apr. 25, 2006

(54) METHOD AND APPARATUS FOR REMOTE CONTROL OF A DISTRIBUTED TELEVISION BROADCASTING SYSTEM

(76) Inventor: Mehmet R. Aras, Bestekar Sokkak 74/10, Ankara (TR) 06680

( * ) Notice: Subject to any disclaimer, the term of this patent is extended or adjusted under 35 U.S.C. 154(b) by 878 days.

(21) Appl. No.: 09/331,756

(22) PCT Filed: Dec. 25, 1996

(86) PCT No.: PCT/TR96/00005

§ 371 (c)(1),
(2), (4) Date: Aug. 23, 1999

(87) PCT Pub. No.: WO98/30026

PCT Pub. Date: Jul. 9, 1998

(65) Prior Publication Data

US 2002/0004936 A1    Jan. 10, 2002

(51) Int. Cl.
*H04N 7/20* (2006.01)
*H04N 7/10* (2006.01)
*H04N 7/25* (2006.01)
*H04N 7/173* (2006.01)

(52) U.S. Cl. .................. 725/66; 725/36; 725/105; 725/107

(58) Field of Classification Search ............ 348/1, 348/6, 9, 12–13, 722, 192–193, 484; 455/5.1, 455/12.1, 3.2; 725/36; 380/234; 707/100; 386/56

See application file for complete search history.

(56) References Cited

U.S. PATENT DOCUMENTS

| | | | |
|---|---|---|---|
| 4,694,490 A * | 9/1987 | Harvey et al. .............. 380/234 |
| 4,829,569 A * | 5/1989 | Seth-Smith et al. ........ 380/234 |
| 4,862,268 A * | 8/1989 | Campbell et al. ........... 348/462 |
| 5,099,319 A * | 3/1992 | Esch et al. ..................... 725/36 |
| 5,216,515 A * | 6/1993 | Steele et al. ................... 386/55 |
| 5,412,416 A * | 5/1995 | Nemirofsky ................. 725/36 |
| 5,504,933 A * | 4/1996 | Saito ............................. 455/2 |
| 5,539,822 A * | 7/1996 | Lett ............................. 348/12 |
| 5,559,549 A * | 9/1996 | Hendricks et al. ............. 348/6 |
| 5,594,490 A * | 1/1997 | Dawson et al. ................ 348/6 |
| 5,594,936 A * | 1/1997 | Rebec et al. ................. 455/3.2 |
| 5,600,364 A * | 2/1997 | Hendricks et al. ............. 348/1 |
| 5,600,573 A * | 2/1997 | Hendricks et al. ............. 348/6 |
| 5,652,615 A * | 7/1997 | Bryan et al. ................... 348/9 |
| 5,666,645 A * | 9/1997 | Thomas et al. .............. 455/6.1 |
| 5,682,195 A * | 10/1997 | Hendricks et al. ............. 348/6 |
| 5,737,595 A * | 4/1998 | Cohen et al. ............... 707/100 |
| 5,990,927 A * | 11/1999 | Hendricks et al. ............. 348/6 |
| 6,034,678 A * | 3/2000 | Hoarty et al. ............... 345/327 |

FOREIGN PATENT DOCUMENTS

EP    0 583 196 A1    2/1994
WO    WO 96/08 923 A1    3/1996

* cited by examiner

*Primary Examiner*—Hai V. Tran
(74) *Attorney, Agent, or Firm*—Nixon & Vanderhye PC

(57) ABSTRACT

A TV broadcast system uses multiplexed and duplex, communication and verification methods, it directs and controls form a central continuity studio one or more remote stand alone TV transmitters to change and/or modify the content of their local broadcast material. Thus it is possible to direct the local broadcast to switch between the general broadcast program or a previously stored (at the remote site) live video. Moreover it is possible to superimpose on the video being broadcast, alphanumeric character and/or image data, which are also previously stored at the remote site.

22 Claims, 10 Drawing Sheets

Fig. 1
Main Components of The System

Fig. 3
Alphanumeric Character and/or Image Production Terminal

*Fig. 5*
Coded Control Commands Generator
and Synchronization Control

*Fig. 6*

Main Components of a Remote TV Station

*Fig. 7*

Remote TV Stations Monitoring Unit
(at The Central Studio)

Fig. 8

Remote TV Station Input/Output Signals Monitoring Unit

Fig. 9
Uninterruptible Power Supply

Fig. 10
Air-conditioning Control System

METHOD AND APPARATUS FOR REMOTE CONTROL OF A DISTRIBUTED TELEVISION BROADCASTING SYSTEM

BACKGROUND OF THE INVENTION

1. Field of the Invention

This invention relates to a TV broadcast system, which using multiplexed and duplex, communication and verification methods, directs and controls from a central continuity studio, one or more remote stand alone TV transmitters to change and/or modify the content of their local broadcast material.

Thus it is possible to direct the local broadcast to switch between the general broadcast program or a previously stored (at the remote site) live video. Moreover it is possible to superimpose on the video being broadcast, alphanumeric character and/or image data, which are also previously stored at the remote site.

The control signals for one or more local TV broadcasts are transmitted simultaneously to remote (TV) stations either as a control signal mutual to all remote sites or separate control signals to selected remote sites by superimposing these signals on the blank horizontal lines occurring during vertical retrace period of each TV picture frame, using Teletext facilities.

The alphanumeric character and/or image data to be broadcast locally by superimposition on live video, are produced at the central studio and are down loaded to the storage facilities at the remote site over modem links.

The storage medium is usually a hard disk if only alphanumeric/image data is to be stored locally or an optical disk if live video is also to be stored locally with or without the alphanumeric/image data superimposed over it at the production site.

2. Related Art

In current practice, remote stand alone TV transmitters rebroadcast over an VHF or an UHF (or a cable) channel, the general TV broadcast of a particular TV network.

However by this method it is not possible to change the local broadcast content at desired times, to change and/or add to, the video broadcast to satisfy local requirements.

In order to accomplish this objective at remote TV transmitters, A TV network has to use local, manned studios, employing manual equipment.

For the large TV network establishments, it usually, is not economical to establish manned local studios at each remote broadcast area.

In practice there can of course be independent local TV broadcasters where economically feasable, but they are usually independent of a large TV network establishment and thus cannot use their program material.

It is also possible to achieve a degree of automation by switching the video program transmission to prerecorded material on videotape by controlling VCR(s) through a computer which is constantly monitoring the duration of a particular program and the real time clock. This method is often used for late night broadcast of programs The TV transmission systems in use, include blank horizontal scan lines during vertical retrace period. these blank lines may be used depending on the choice of the broadcaster for, either Teletext, Data Broadcast or VPS.

SUMMARY OF THE INVENTION

Using the same method, control signals may be transmitted to the remote TV stations and the equipment therein may be directed to perform, actions to obtain the objectives of changing or modifying the content of the local broadcast.

It is also possible to send over the Teletext system, to be stored at the remote station, alphanumeric/image data with resolution and quality limited by the definition of the Teletext system itself.

However in this method, overlooking the limited resolution and quality of the data sent, it is not possible to determine or control the loss of data resulting from open transmission medium of satellite up/down links. The data received at the remote station by this method has a high chance of containing blanks or other characters instead of the correct ones.

Another method is to insert data onto the blank horizontal scan lines using methods other than Teletext, however data can be transmitted at a rather slow rate due to the limited time available for data transmission in relation to the overall time required to transmit one picture frame.

Consequently, the data transmission method over the vertical retrace period.

1. Requires repetitive data transmission in order to minimize data loss, and
2. Low transmission speed (of data) causes application problems by impeding the transmission of high resolution data of any reasonable file size, within a reasonable time duration.

This invention provides the capability for large TV networks to control their own remote stand alone TV transmitters, to broadcast locally sourced programs at any requested time and for any duration, intended for the local TV receiving area of any particular remote station(s).

The remote station(s) are addressed and instructed for above actions trough control codes transmitted using Teletext methods.

Additionally the same methods enable the capability to switch between general or local programming at the remote station and to add to this live video, alphanumeric/image data intended only for that particular broadcast region.

The remote control codes are transmitted, when the operator at the central studio presses a single button on his control console or a key on the keyboard of the Teletext transmitter.

This provides a mechanism to take into account, delays and overruns in program broadcasts, such that the general and the local broadcasts do not conflict or intervene with each other, with respect to content of program materials.

The control codes are inserted on the blank horizontal lines occurring during to vertical retrace period. Each different code is repeated at required number of times to minimize the chance of data loss at the remote station.

Since the real time control of remote stations are required. The only choice is to transmit the control codes over the video transmission channel.

To verify the reception of the control codes by the remote station all the received codes are logged into a file and this log file is checked against the log of the transmitted codes through modem link.

The remote station has the capability to automatically report, the reception of control codes and/or any errors in reception of the codes to the remote station monitoring computer at the central studio through modem link. This feature enables the modification and changing the number of repetitions of the control codes to enable the remote station(s) to correctly receive the transmitted control codes.

Similarly the remote stations can report the results of the actions it has taken and/or any fault condition to the central studio.

This invention comprises the system and the methods to transmit simultaneously to one or more remote stations, over either modem/telephone network or satellite data links, alphanumeric/image data and/or analog video (and sound) which may be stored on hard or optical disks at the remote station(s), with the verification of the correct reception of the transmitted data implemented during the transmission time, and the local broadcast of the data thus stored, from any number of selected remote tations, through control codes transmitted from the central studio using teletext facilities, at any desired time.

DETAILED DESCRIPTION OF EXEMPLARY EMBODIMENTS

This invention consists of automatic systems, which under direction and control of the central broadcasting continuity studio, and through a verifiable communications environment simultaneously enable one or more remote TV stations to automatically change the source of video to be locally broadcast and/or modify this video with additional alphanumeric/image data.

The "Continuity Studio" is defined as the central broadcast studio of a TV network where the various program material, produced within the TV network or any of its annexes are switched into general broadcast for reception by the final receivers.

The "Remote Station" is defined as the site where the (VHF/UHF)Transmitting or Cable Distribution equipment, together with communications equipment such as radio-link or satellite receiving equipment providing the link to the "Continuity" studio are situated. From the "Remote Station" the broadcast programs reach the final receivers (viewers).

The "Changing of the Broadcast Content" is defined as replacing and broadcasting from the Remote Stations a Video program from a source, which is different from that coming from the Continuity Studio.

"Modification of the Broadcast Content" is defined as the superimposition of alphanumeric/image data on the analog video at the Remote Station and broadcasting the resulting modified signal.

"Control" is defined as, the establishment of a communications link between the Continuity Studio and the Remote Station to transmit the alphanumeric/image data files to the remote station computer, the verification of correct and complete reception of data files by the Remote Station and the reporting by the Remote Station to the monitoring computer at the central studio of any faulty condition and/or action in response to the control codes received from the Continuity studio.

"Direction" is defined as the control codes transmitted to the desired number of Remote stations on to taking actions as required at any time by the broadcast continuity operator.

Figure 1:
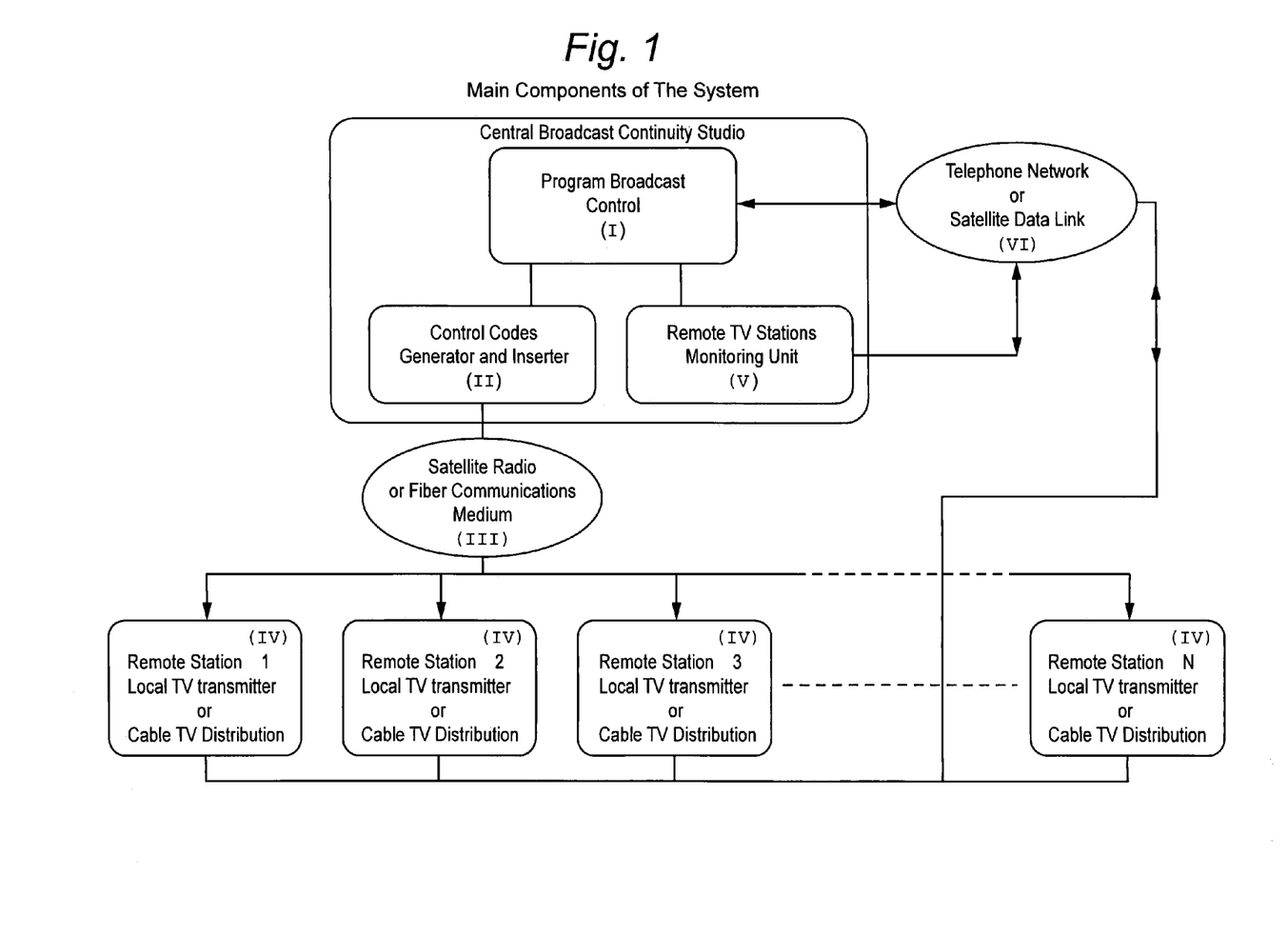
FIG. 1: Main components of the system.

The main components of the system as shown in FIG. 1 are:

The Continuity studio broadcast control unit (I), control codes generator and inserter (II), used to address and initiate actions at the selected remote stations, Satellite, Radio or Fiber communications medium (III) to establish communications links to remote stations, The remote station(s) system: which detects and takes action on the control codes received from the continuity studio (IV).

The monitoring system which logs the actions taken by the remote stations or queries any remote station automatically at pre selected times (V), and finally, The telephone network or the satellite data link (VI) enabling communication between the remote stations and the monitoring system.

The Continuity Studio Broadcast management unit consists of three sections.

Figure 2:
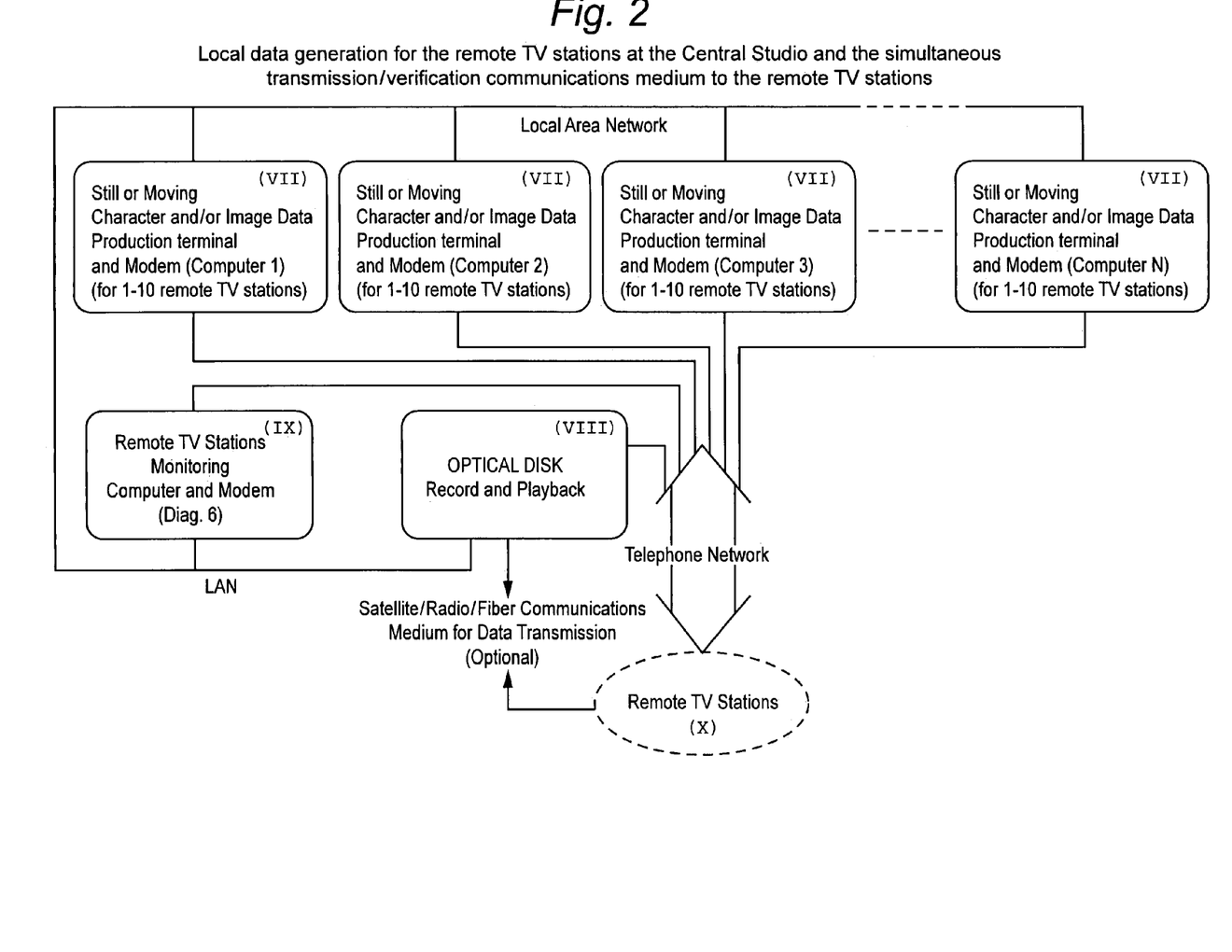
FIG. 2: alphanumeric/image data production for the remote stations, at the central broadcasting studio and the simultaneous transmission/verification communications medium to the remote TV stations.

In the first section shown in FIG. 2. are a number of local area networked terminals (FIG. 2-VII) producing alphanumeric character and/or image data files for the remote stations. These stations are linked to the remote stations over modem and through telephone network or satellite data links.

An optical disk recording/playback unit (FIG. 2-VI*II*) may also used to transmit the data files to the remote stations through the same telephone or satellite links.

The second section is the remote station monitoring unit (FIG. 1-V, FIG. 2-IX) which receives the broadcast actions log of each and every remote station to do physical and contextual controls of activities.

Contextual control means checking the correct and complete reception of data files by the remote stations under supervision of the continuity studio broadcast control unit (FIG. 1-I)

Physical control is the reporting of fault or alarm conditions at any remote station.

The third section consists of Program Broadcast control unit and the control codes generator and inserter (FIG. 1-I,II) the details of which will be given further on.

Production at the central studio, of Data and Video Programs for Remote Broadcast.

Static and/or animated alphanumeric character and/or image data file production and the transmission of these files to remote stations makes up the first part broadcast management unit of the Continuity Studio.

FIG. 2 shows a number of alphanumeric character and/or image data production terminals which can share, each others data base over a local area network, for the purpose of producing and transmission of data files unique to one or more remote station(s).

Each terminal may be dedicated to one or more (10 remote stations as shown in FIG. 2) remote stations as the job load requires, or one terminal may be dedicated for each remote station.

Each terminal can reach any remote station over its own modem, and with a sufficient number of terminals, any number of remote stations may be accessed simultaneously.

The alphanumeric character and/or image data produced on each terminal is stored as data files on hard disk and transmitted to any particular remote station at any time over modem to be stored on the hard disk of the remote station's computer. The duplex communications established over modem and the inherent features of the communications software enable instant detection of transmission errors and the complete transfer of any data files to the remote station.

The modem/telephone network communications link to the remote stations is the most reliable link for data transfer as it is highly isolated from external sources of interference, moreover providing operational ease for the complete system when the TV channel itself is not used for data transfer.

An identifying code attached to each file of alphanumeric character/image data, enables the remote station to choose the file(s) to be (displayed) broadcast, the order of files to be broadcast, duration of the broadcast and the method of display (static, moving etc.)

The analog video programs prepared for remote regional broadcast may be transmitted to the remote stations, to be stored on optical disk there, using any communications link such as, Wideband PCM, Fiberoptic or Radio-Link as well as modem and telephone network.

Optical disk recording provides the advantages of digital recording of data minimizing recording errors, much faster access to any data file, as well as less mechanical movement, reducing the chance of equipment breakdowns as compared to VCR recording.

Figure 3:
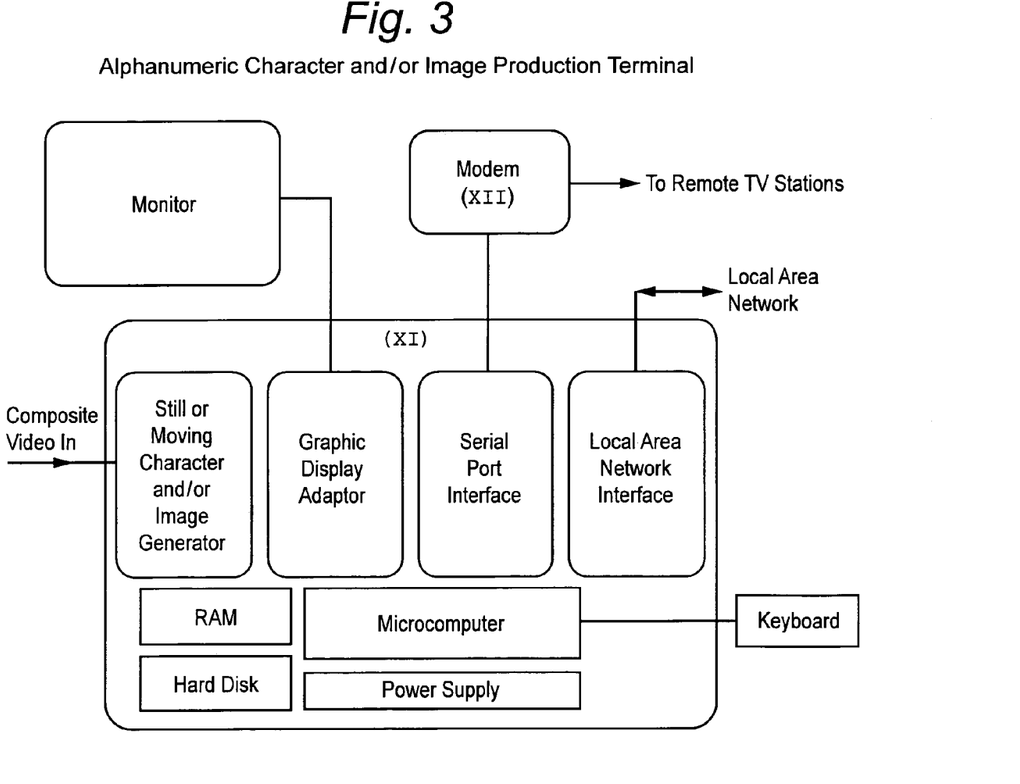
FIG. 3: Alphanumeric character and/or Image production terminal.

The Alphanumeric character and/or Image production terminal (FIG. 3-XI) is equipped with a special character generator program and a special graphics display adapter card, enabling the operator to place anywhere on the screen alphanumeric characters with a very wide range of various fonts, sizes, and colors and/or any color or size of images and to choose the direction, speed and style of display from a wide range of choices available.

The terminal operator at his choice may superimpose the alphanumeric/image data thus produced on any external analog video to view the result on his screen, and makes any changes he desires, storing the final version of the alphanumeric/image data as data files on hard disk.

At any later time the terminal operator using a modem (FIG. 3-XII) may transmit the data file produced, checked and stored in his terminal, to any remote station.

Monitoring of the Remote Stations.

Figure 7:
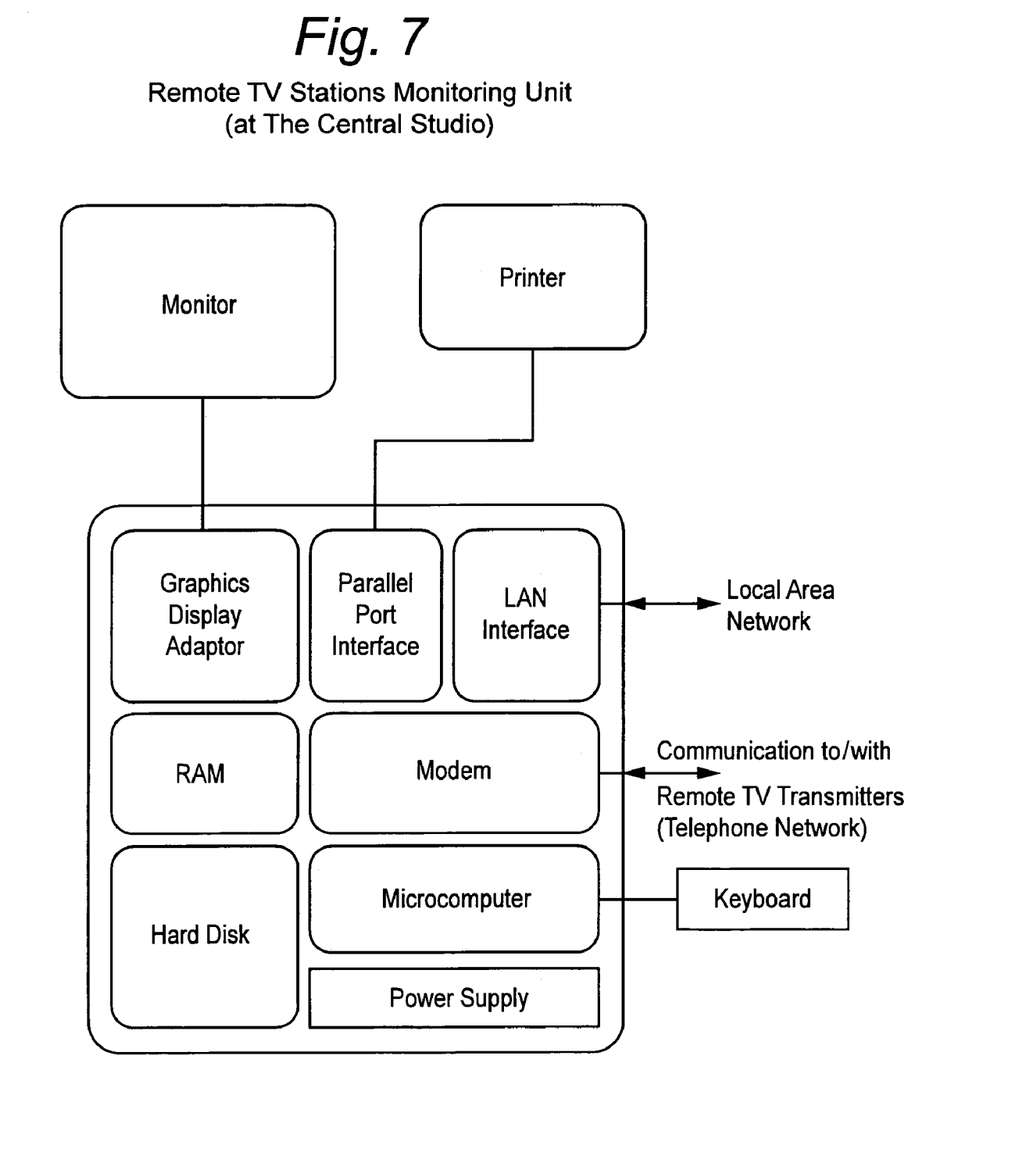
FIG. 7: Remote TV Stations Monitoring Unit

The second part of the Central Broadcast Contiuity Studio is the Remote Stations' Monitoring unit, (FIG. 2-V, details: FIG. 7) is capable of remotely controlling and monitoring of all the functions of any remote station as well as logging on the hard disk and printing on paper, activity and/or error reports transmitted periodically from all remote stations.

Since the monitoring unit is also a node on the local area network, data production terminal operator, or the Central Broadcast Continuity Studio, Program Continuity operator (through the synchronization control (FIG. 4-XVII)) an be quickly notified of an error condition at any of the remote stations, and both can take actions necessary to correct the error condition.

The contextual errors are corrected by data terminal operator, while to non-broadcast errors at any remote station, can be corrected by the re-sending control codes through the Synchronization control unit.

The monitoring unit controls the following essential physical data at the remote stations, which are either reported by the remote stations at preset hours or prompted by the monitoring unit at any time.

Remote station operating information such as start and end times of program broadcast, source change and/or modification, Identification of the programs already broadcast and the actual duration these programs.

The status and (any) fault report of the equipment at the remote station, as well as power fail, UPS and Air-condition unit status information.

Faults reported by the remote stations about loss or out of preset limits of the signal received from satellite down-ink.

Management of the Remote Station Broadcasting

The third part of the Central Broadcast Continuity Studio is the Program broadcast control and the control codes generator and inserter (FIG. 1-I and II). A TV network, using both of these units can control its own remote stations to change or modify their local broadcast material with respect to the general broadcast program.

The remote station control codes which start the change or modification of the local broadcast (and other possible actions) at any remote station are inserted on blank horizontal lines during the vertical retrace period.

To minimize the chance of error due to possible data loss in the communications medium, the control codes are repeated a sufficient number of times to ensure proper reception by the remote station.

Since the control command codes use Teletext facilities, The TV network may also use this facility for regular Teletext service. Consequently the control codes are placed on hex numbered pages, which a normal TV receiver can not decode.

Figure 4:
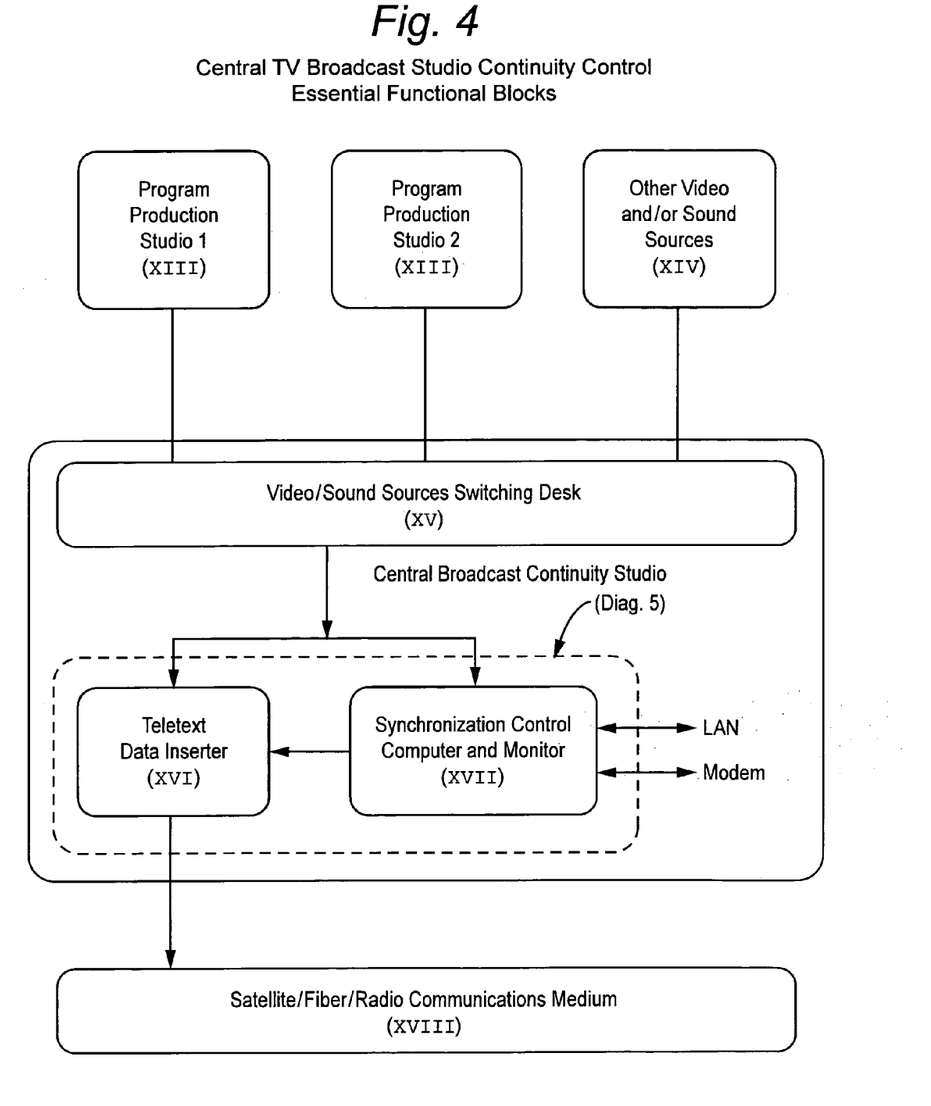
FIG. 4: Central TV Broadcast Studio Continuity Control, Essential Functional Blocks.
Figure 5:
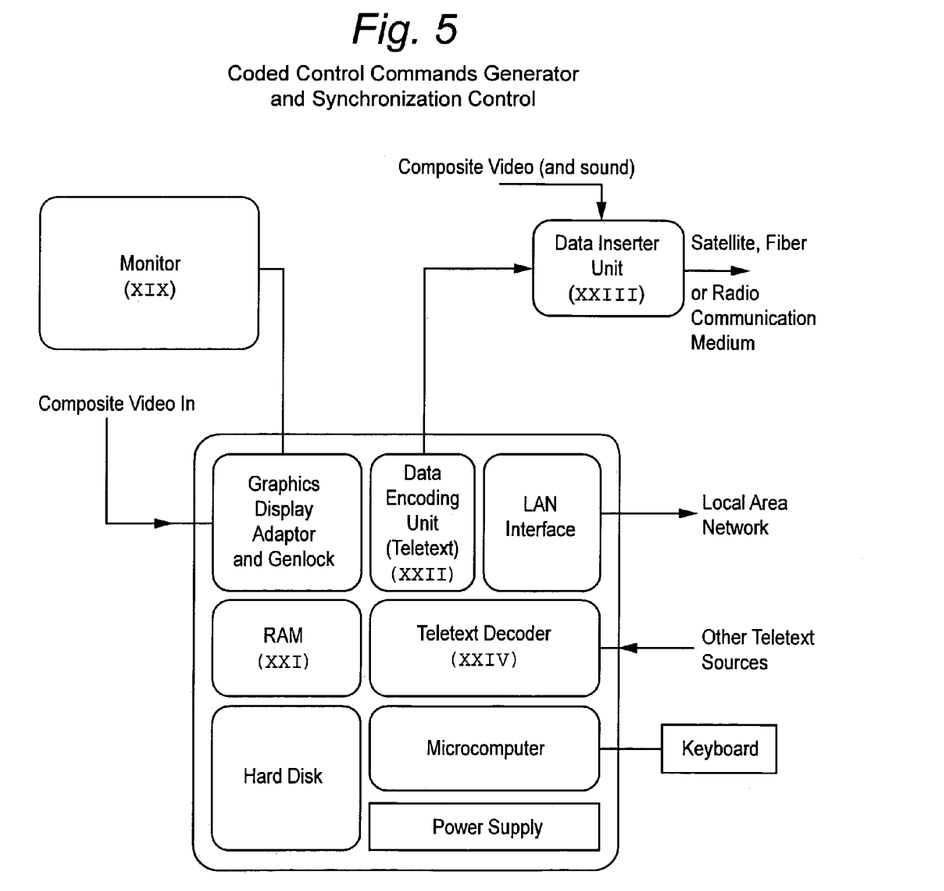
FIG. 5: Coded Control Commands Generator and Synchronization control.

The equipment as detailed in FIG. 5 and shown as a part of Central continuity studio in FIG. 4 enables previously stored programs and/or data at the remote station to start, to be broadcast.

Programs from different video sources (FIG. 4-XII and -XIV) are switched onto the broadcast output by the Switching desk (FIG. 4-XV) inputting to the Teletext Inserter (FIG. 4-XVI) The other input of the Teletext inserter are the control codes in form of teletext data. The Inserter combines the video source and the teletext information into a single broadcast channel, transferring the resulting composite signal into the Remote Stations Transmission medium. (FIG. 4-XVIII).

The operator watching the program flow on the monitor of the "synchronization control computer" (Specially adapted to display TV video) FIG. 5-XIX enters (generally) single or multikey inputs on the keyboard (FIG. 5-XX} to transfer the control codes stored in memory (FIG. 5-XXI) first to the Data Encoder (FIG.-5XXII) which adapts the codes to the teletext system and then to the Data Inserter (FIG. 5-XXIII) to be inserted on blank horizontal lines of vertical retrace period, outputting the composite video plus teletext signal into the transmission medium to remote stations.

The remote stations upon receiving these codes are directed to start, stop (or initiate other) remote station activities.

The operator may at his choice either view the control codes transmitted, as superimposed on the video broadcast or only as a teletext page. The computer may be also programmed to initiate transmission of control codes at preset times.

The control codes transmitted to remote stations in general define: the identification tags of data files, the order of display of these files, duration of display, start/stop display, Start/stop the optical disk, and go to a specific program on the disk.

The synchronization control computer is also equipped with a teletext decoding unit (FIG. 5-XXIV) and software, enabling it to monitor other teletext sources and to insert into the broadcast channel as normal teletext service if so desired.

Remote station equipment and functions.

Figure 6:
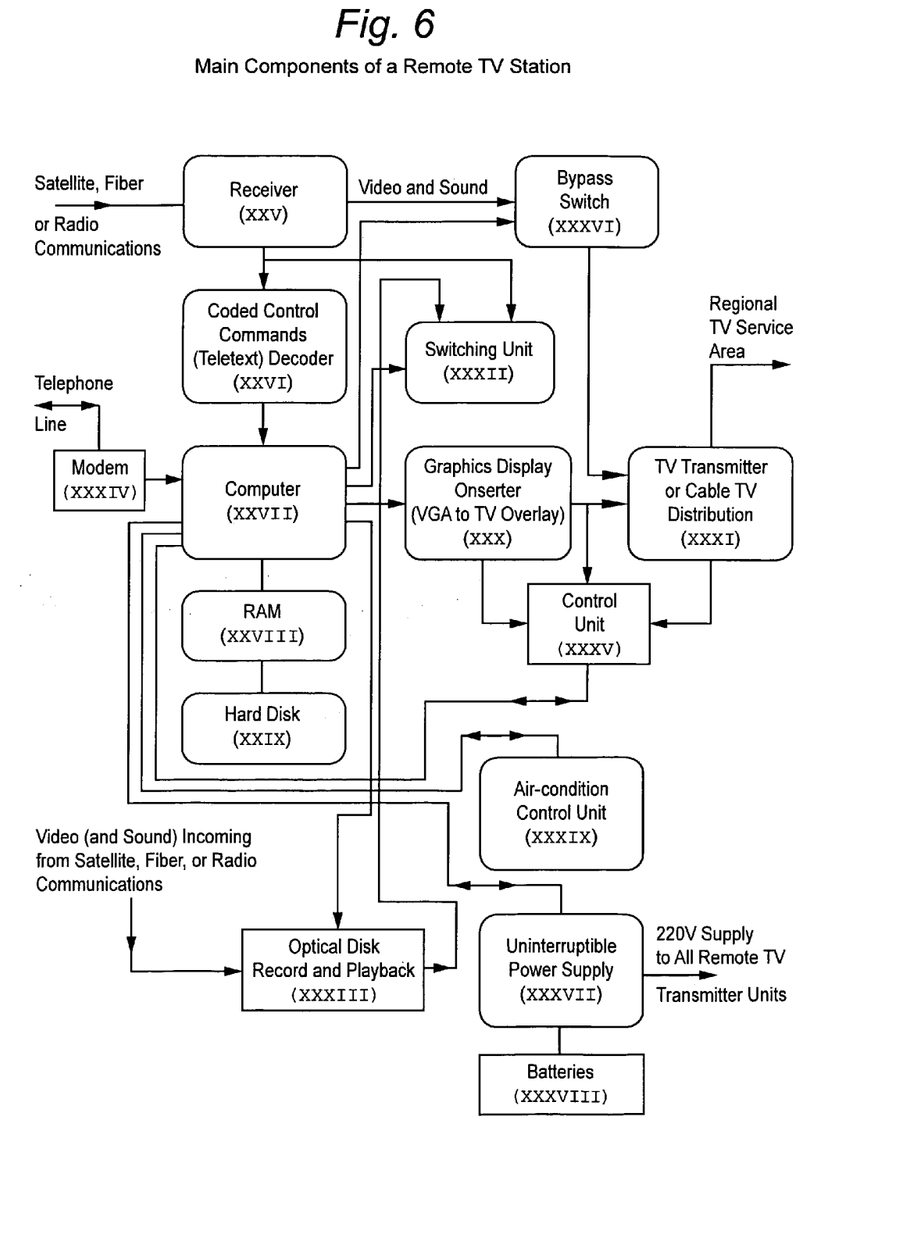
FIG. 6: Main components of a Remote TV station.

The remote station details are shown in FIG. 6 In this figure a satellite/TV receiver (FIG. 6-XXV) (or a fiber optic or radio-link receiver) separates the video signal from the transmitting medium and demodulates the TV channel carrier to obtain the composite video output signal (and separately the sound). The composite video output of the receiver (which includes the general video broadcast, synch. Pulses and the remote station control codes inserted as teletext information).

The Teletext Decoder (FIG. 6-XXVI) extracts the coded control commands and passes them on to the computer (FIG. 6-XXVI).

The Teletext software on the computer decodes the control codes and then as irected, loads the data file(s) previously stored on hard disk (FIG. 6-XXIX) on to the RAM (FIG. 6-XXVIII), Starts the graphics programs which transfer the data file(s) to the Graphics Display Onserter hardware (FIG. 6-XXX), which in turn onserts the alphanumeric and/or Image data on the video source. The video source is also selected according to control commands received.

To output of the Graphics Display Onserter is fed into the input of the TV transmitter or the Cable Distribution equipment (FIG. 6-XXXI).

The change in programs broadcast (from any particular remote station) are again done upon receiving the proper control commands from the teletext of the general broadcast, and by controlling the switching unit (FIG. 6-XXXII) ) which either switches in video from the optical disk (FIG. 6-XXXIII) or the video from the general broadcast.

The alphanumeric and/or Image data files reach the remote station on the modem (FIG. 6-XXXIV) and the telephone network.

The computer stores the received files on the hard disk or the optical disk, and sends correct and complete reception information back over the modem link.

The analog video information may reach the remote station through, satellite, fiber or radio-link communication channels, and by control commands sent from the Central Broadcast studio, are recorded on optical disk.

Figure 8:
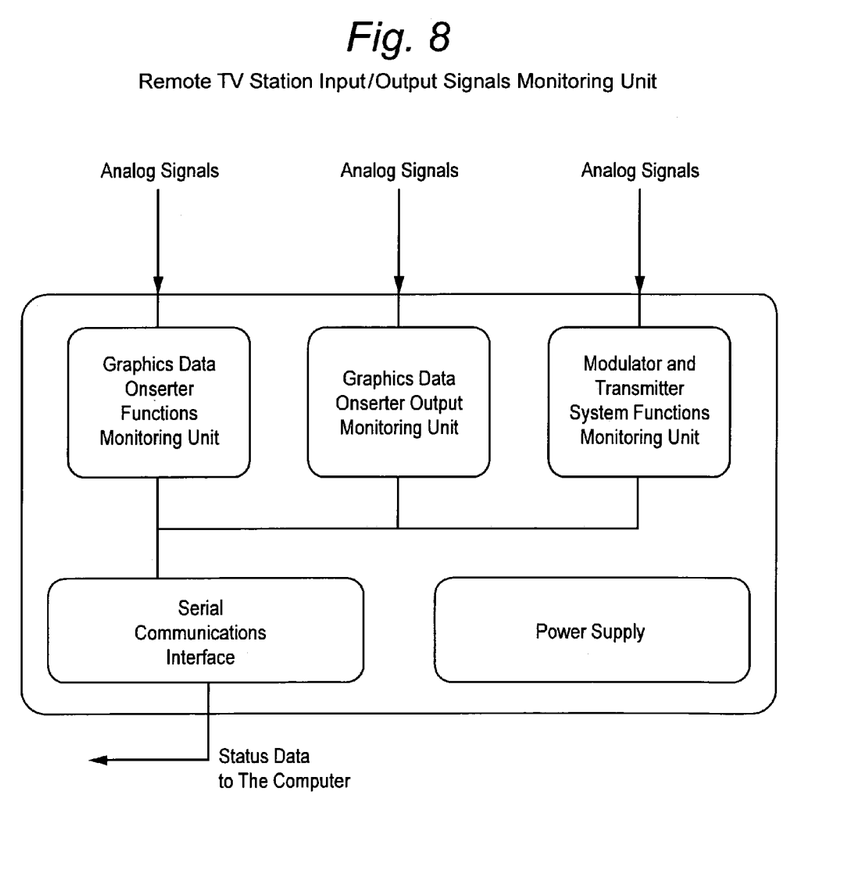
FIG. 8: Remote TV station Input/output signals monitoring unit.

The Control Unit (FIG. 6-XXXV) continuously monitors the functioning of the Graphics Overlay Inserter, the output of the Graphics Overlay Inserter and the TV transmitter functions as detailed in FIG. 8.

Analog signals from the Graphics Overlay Adaptor are checked by the Control unit to see whether the actions as directed by the control codes received over teletext are implemented and Graphics overlayed video output exists.

The output of the transmitter are also checked to if it exists and is within specified limits.

Any error or fault condition in above measurements is reported by this control unit to the remote station computer (FIG. 6-XXVII), and the maintenance sw running on this computer reports the status of the equipment to the monitoring unit in the central broadcast continuity studio.

The Bypass Switch (FIG. 6-XXXVI) upon loss of functioning of any unit in the remote station except the receiver (FIG. 6-XXV) and the transmitter (FIG. 6-XXXI) will automatically feed the receiver output directly to the receiver input ensuring the continuity of the local broadcast of the program received from the central broadcast studio.

The Bypass Switch will function upon control signals of the computer (FIG. 6-XXVII) or upon non-reception of control signals for a preset duration.

Figure 9:
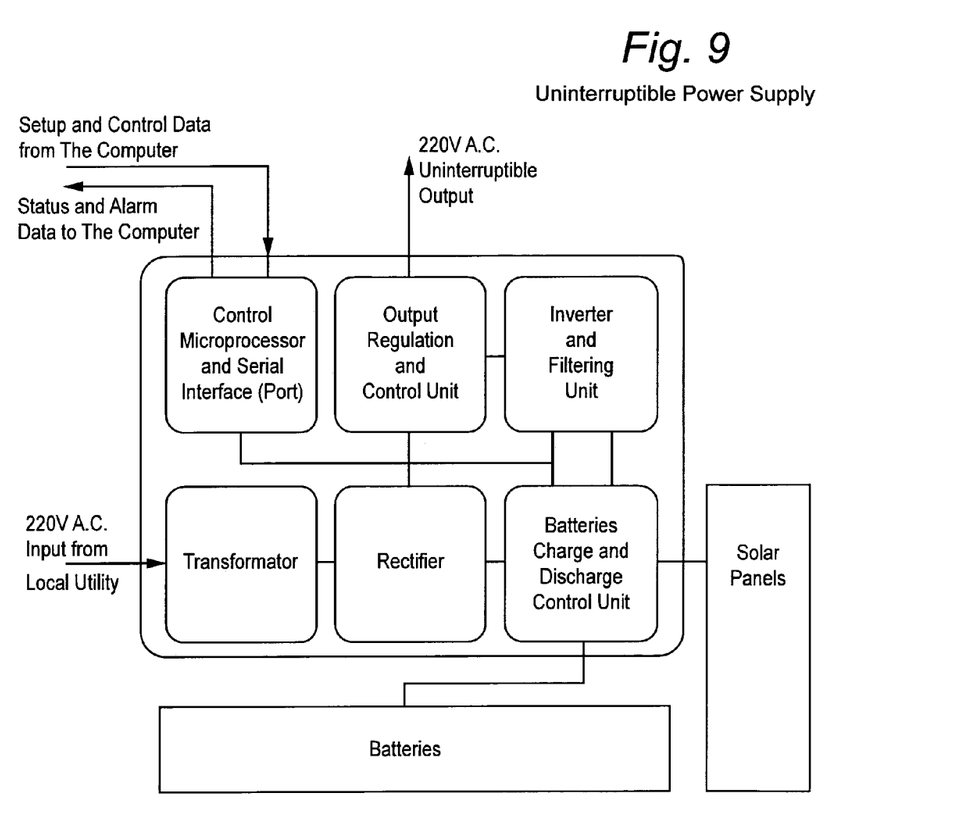
FIG. 9: The Uninterruptible Power Supply.
Figure 10:
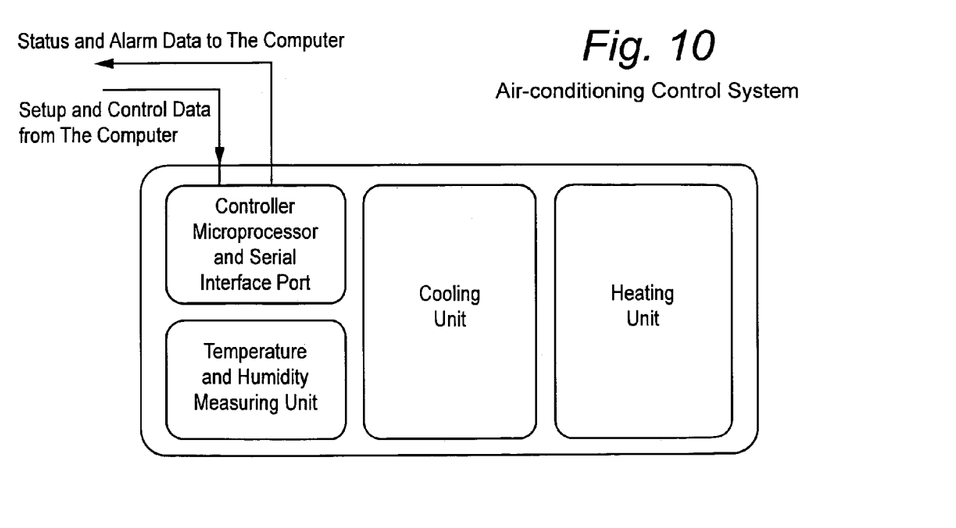
FIG. 10: Air-conditioning control system.
Figure 11:
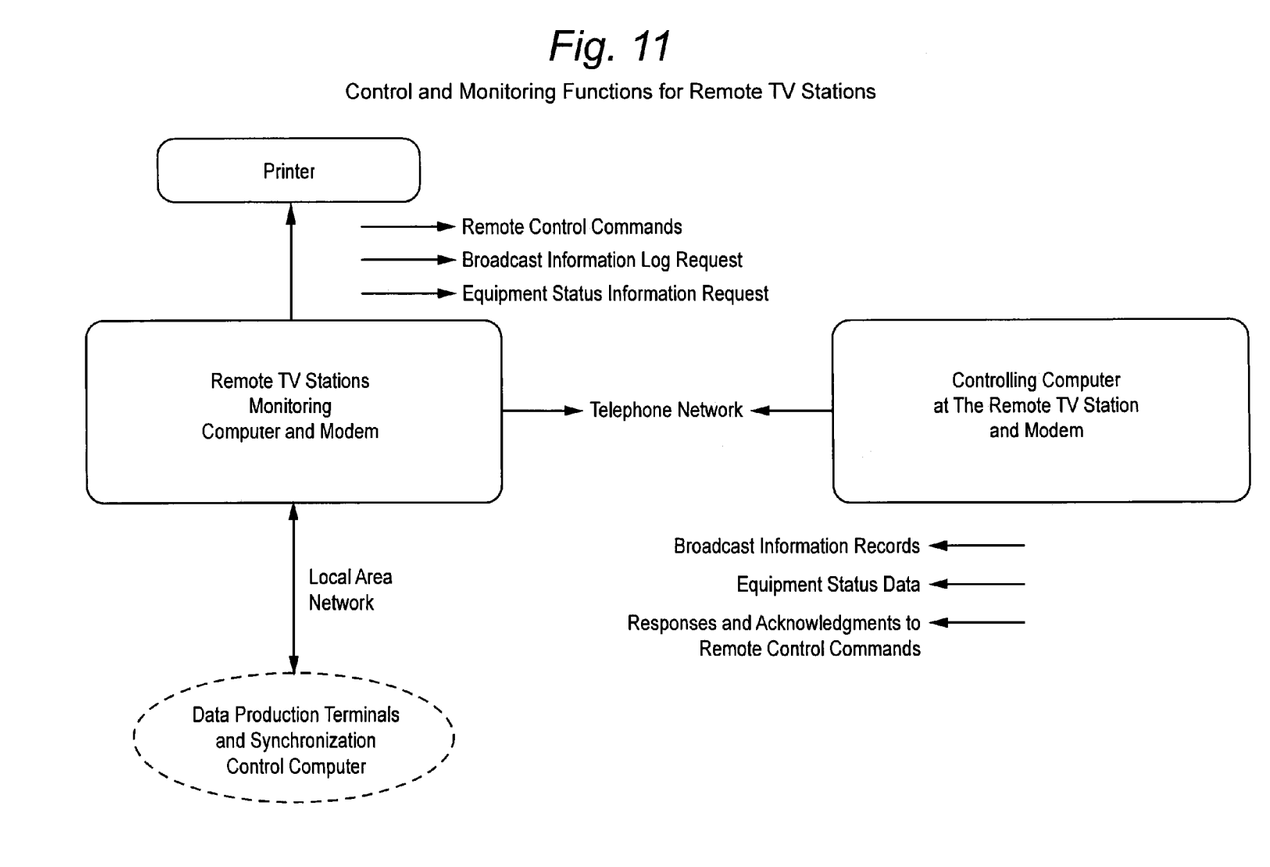
FIG. 11: Control and monitoring functions for Remote TV stations.

The uninterruptible power supply (UPS) (FIG. 6-XXX-VII) also shown in detail in FIG. 9, produces 220V. A.C. power from energy stored in batteries (FIG. 6-XXXVIII) to feed the remote station units. The batteries are charged from the utility power and/or solar panels.

The microprocessor controlled UPS functions under control and supervision of the remote station computer (FIG. 6-XXVII).

The Air-conditioning Control (FIG. 6-XXXIX) has the purpose of create an climatic environment in which the equipment will operate in their specified temperature and humidity limits. Similarly the Air-conditioning unit functions under control of the computer (FIG. 6-XXVII).

The main functions of the remote station computer (FIG. 6-XXVII) are:

To receive the data files sent from central broadcast control studio over modem and the telephone network, and to store these files on hard and/or optical disk, send back the verification information on correct and complete reception.

To decode remote station control command codes transmitted on the TV channel in the teletext pages, to take actions required by the control commands, to log and to report back over modem the received commands and the actions taken, to the remote stations monitoring unit (FIG. 1-V, FIG. 2-IX).

To monitor and supervise the remote station equipment upon control commands received or by its own maintenance programs, and to log on a file, store on hard disk and periodically report back the status information of remote station equipment to the monitoring unit (FIG. 1-V, FIG. 2-IX) over modem.

To report to the monitoring unit, at any time under the prompting of the monitoring unit over modem, real time status information and/or the status log file.

Any modification or additions to the invention as described in detail above, by qualified personnel within the scope of patent application claims in the annex will be considered a part of the invention.

What is claimed is:

1. A TV broadcast method for a system to be operated from a TV continuity studio within the control of a broadcast flow unit, said method comprising:
   (a) generating alphanumeric characters and/or image data separately for each of plural remote sites at a central site and transmitting said alphanumeric characters and/or image data therefrom to said plural remote sites via a modem;
   (b) detecting whether said alphanumeric characters and/or image data have been received correctly at the said remote sites via said link;
   (c) generating and transmitting command codes within non-displayed portions of broadcast television signals to remotely control each of said remote sites from the said central site;
   (d) converting said alphanumeric characters and/or image data to local vision materials with a graphic generator at each of said remote sites;
   (e) at each remote site, overlaying said local vision material synchronously onto the continuing general television signal without cutting off the main general broadcast; and
   (f) detecting whether the said local vision materials have been broadcast via transmission of digital information sent back to the central site.

2. A TV broadcast method as in claim 1 further including:
(g) producing still or moving alphanumeric characters and/or image data at the central site continuity studio; and
(h) simultaneously transmitting the alphanumeric characters and/or image data to a selected number of said remote sites through a modem.

3. A TV broadcast method as in claim 1 further including:
(i) controlling and verifying whether the data present at the central site and sent to remote stations have been received correctly by using a modem.

4. A TV broadcast method as in claim 1 further including:
(g) generating and transmitting command codes within the broadcasting process, either automatically or semi-automatically under an operator's control, to remote sites by using the vertical blanking intervals and/or hex numbered pages of the teletext transmission.

5. A TV broadcast method as in claim 1 wherein a decoder at each remote site extracts, decodes, and transfers commands coming through teletext to a remote site computer.

6. A television broadcast method as in claim 1 wherein said command codes from the central managing and controlling site act to control:
(a) functions,
(b) switches between general or differentiated transmissions to a corresponding broadcast area from a storage medium for still or moving character and/or image data to a display producing area in a remote site,
(c) reports of a control process to a central site continuity studio; and
(d) starts, stops, differentiation of one or more process.

7. A TV broadcast method as in claim 1 wherein:
(g) said alphanumeric character and/or image data sent from the central site are converted at the remote site to local vision materials as subtitles, graphics, footer, frame, or animation using a graphical generator, decoder, inserter, hard disk and CD-ROM, recorder/reader.

8. A TV broadcast method as in claim 1 wherein hardware at each remote site controls:
(a) actual overlay of the said local vision materials;
(b) signal levels from the satellite receiver; and
(c) output from a cable head end and/or TV transmitter to be within acceptable pre-defined limits.

9. A TV broadcast method as in claim 1 further including:
(g) sending querying data about the operations at the remote site, error reports to the central continuity studio and, when desired, remote site operational information from the continuity studio through modem/telephone network and/or satellite data link.

10. A TV broadcast method as in claim 1 wherein a decoder at each remote site extracts, decodes, and transfers commands coming through teletext to a remote site computer.

11. A TV broadcast method as in claim 1 further including:
(g) generating and transmitting command codes within the broadcasting process, either automatically or semi-automatically under an operators control, to remote sites by using the vertical blanking intervals and/or hex numbered pages of the teletext transmission.

12. A television broadcast method as in claim 1 wherein said command codes from the central managing and controlling site act to control:
(a) functions,
(b) switches between general or differentiated transmissions to a corresponding broadcast area from a storage medium for still or moving character and/or image data to a display producing area in a remote site,
(c) reports of a control process to a central site continuity studio; and
(d) starts, stops, differentiation of one or more process.

13. A TV broadcast method as in claim 1 wherein:
(g) said alphanumeric character and/or image data sent from the central site are converted at the remote site to local vision materials as subtitles, graphics, footer, frame, or animation using a graphical generator, decoder, inserter, hard disk and CD-ROM, recorder/reader.

14. A TV broadcast method as in claim 1 wherein hardware at each remote site controls:
(a) actual overlay of the said local vision materials;
(b) signal levels from the satellite receiver; and
(c) output from a cable head end and/or TV transmitter to be within acceptable pre-defined limits.

15. A TV broadcast method as in claim 1 further including:
(g) sending querying data about the operations at the remote site; error reports to the control continuity studio and, when desired, remote site operational information from the continuity studio through modem/telephone network and/or satellite data link.

16. A TV broadcast system to be operated from a TV continuity studio within the control of a broadcast flow unit, said system comprising:
(a) means for generating alphanumeric characters and/or image data separately for each of plural remote sites at a central site and transmitting said alphanumeric characters and/or image data therefrom to said plural remote sites via a modem;
(b) means for detecting whether said alphanumeric characters and/or image data have been received correctly at the said remote sites via said link;
(c) means for generating and transmitting command codes within non-displayed portions of broadcast television signals to remotely control each of said remote sites from the said central site;
(d) means for converting said alphanumeric characters and/or image data to local vision materials with a graphic generator at each of said remote sites;
(e) means for at each remote site, overlaying said local vision material synchronously onto the continuing general television signal without cutting off the main general broadcast; and
(f) means for detecting whether the said local vision materials have been broadcast via transmission of digital information sent back to the central site.

17. A TV broadcast system as in claim 16 further including:
(g) means for producing still or moving alphanumeric characters and/or image data at the central site continuity studio; and
(h) means for simultaneously transmitting the alphanumeric characters and/or image data to a selected number of said remote sites through a modem.

18. A TV broadcast system as in claim 16 further including:
(g) means for controlling and verifying whether the data present at the central site and sent to remote stations have been received correctly by using a modem.

19. A TV broadcast method for a system to be operated from a centralized TV broadcast facility, said method comprising:

(a) generating alphanumeric characters and/or image data separately for each of plural remote sites at a central site and transmitting said alphanumeric characters and/or image data therefrom to said plural remote sites via a modem;

(b) detecting whether said alphanumeric characters and/or image data have been received correctly at the said remote sites via said link;

(c) transmitting broadcast television signals from the central site to each of said plural remote sites;

(d) generating and transmitting command codes within non-displayed portions of broadcast television signals to remotely control each of said remote sites from the said central site;

(e) converting said alphanumeric characters and/or image data to local vision materials with a graphic generator at each of said remote sites;

(f) at each remote site, overlaying said local vision material synchronously onto the television broadcast signals without cutting off the television broadcast signals; and (g) detecting whether said local vision materials have been broadcast via transmission of digital information sent back to the central site.

20. A TV broadcast system to be operated from a centralized TV facility, said system comprising:

(a) means for generating alphanumeric characters and/or image data separately for each of plural remote sites at a central site and transmitting said alphanumeric characters and/or image data therefrom to said plural remote sites via a modem;

(b) means for detecting whether said alphanumeric characters and/or image data have been received correctly at the said remote sites via said link;

(c) means for transmitting broadcast television signals from the central site to each of said plural remote sites;

(d) means for generating and transmitting command codes within non-displayed portions of broadcast television signals to remotely control each of said remote sites from the said central site;

(e) means for converting said alphanumeric characters and/or image data to local vision materials with a graphic generator at each of said remote sites;

(f) means, at each remote site, for overlaying said local vision material synchronously onto the television broadcast signals without cutting off the television broadcast signals; and (g) means for detecting whether said local vision materials have been broadcast via transmission of digital information sent back to the central site.

21. A method of controlling each of a plurality of remote broadcast sites from a television studio, said method comprising:

(a) generating alphanumeric characters and/or image data separately for each of the remote broadcast sites at a central site and transmitting said alphanumeric characters and/or image data therefrom to said plural remote broadcast sites via a modem;

(b) detecting whether said alphanumeric characters and/or image data have been received correctly at the remote broadcast sites via said link;

(c) transmitting broadcast television signals from the central site to each of said plural remote broadcast sites;

(d) generating and transmitting command codes within non-displayed portions of broadcast television signals to remotely control each of said remote broadcast sites from the said central site;

(e) converting said alphanumeric characters and/or image data to local vision materials with a graphic generator at each of said remote sites;

(f) at each remote site, overlaying said local vision material synchronously onto the television broadcast signals without cutting off the television broadcast signals; and (g) detecting whether the local vision materials have been broadcast via transmission of digital information sent back to the central site.

22. A system for controlling each of a plurality of remote broadcast sites from a television studio, said method comprising:

(a) means for generating alphanumeric characters and/or image data separately for each of the remote broadcast sites at a central site located within said television continuity studio, and transmitting said alphanumeric characters and/or image data from said central site to said plural remote broadcast sites via a modem;

(b) means for detecting whether said alphanumeric characters and/or image data have been received correctly at the remote broadcast sites via said link;

(c) means for transmitting broadcast television signals from the central site to each of said plural remote broadcast sites;

(d) means for generating and transmitting command codes within non-displayed portions of broadcast television signals to remotely control each of said remote broadcast sites from the said central site;

(e) means for converting said alphanumeric characters and/or image data to local vision materials with a graphic generator at each of said remote sites;

(f) means, at each remote site, for overlaying said local vision material synchronously onto the television broadcast signals without cutting off the television broadcast signals; and (g) means for detecting whether the local vision materials have been broadcast via transmission of digital information sent back to the central site.

\* \* \* \* \*